(12) United States Patent
Kiyokawa

(10) Patent No.: US 11,926,475 B2
(45) Date of Patent: Mar. 12, 2024

(54) STACKER CRANE CONTROL SYSTEM

(71) Applicant: Daifuku Co., Ltd., Osaka (JP)

(72) Inventor: Wataru Kiyokawa, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 175 days.

(21) Appl. No.: 17/579,954

(22) Filed: Jan. 20, 2022

(65) Prior Publication Data

US 2022/0227578 A1  Jul. 21, 2022

(30) Foreign Application Priority Data

Jan. 21, 2021 (JP) ................... 2021-007749

(51) Int. Cl.
*B65G 1/04* (2006.01)
*B66F 9/075* (2006.01)

(52) U.S. Cl.
CPC .......... *B65G 1/0421* (2013.01); *B66F 9/0755* (2013.01)

(58) Field of Classification Search
CPC .......... B66F 9/0755; B66F 9/075; B66F 9/20; B66F 9/07; B65G 1/04; B65G 1/0421
USPC ...................................................... 198/347.1
See application file for complete search history.

(56) References Cited

U.S. PATENT DOCUMENTS

| | | | |
|---|---|---|---|
| 11,661,279 B2 * | 5/2023 | Sullivan ............... | B65G 1/1373 700/218 |
| 11,708,218 B2 * | 7/2023 | Kapust ................. | B65G 1/0492 700/218 |
| 2007/0059132 A1 | 3/2007 | Akamatsu et al. | |

FOREIGN PATENT DOCUMENTS

| | | | | |
|---|---|---|---|---|
| EP | 1627830 | * | 2/2006 | .............. B65G 1/04 |
| JP | 61-60507 | * | 3/1986 | ........... B65G 1/0421 |
| JP | S6160507 A | | 3/1986 | |
| JP | 422801 B2 | | 4/1992 | |
| JP | 201018426 A | | 1/2010 | |

* cited by examiner

*Primary Examiner* — James R Bidwell
(74) *Attorney, Agent, or Firm* — The Webb Law Firm

(57) ABSTRACT

A control system includes: a sway detection unit configured to detect a reference swaying amount that is a swaying amount of a mast at a detection height, which is set to be greater than or equal to a height of a lowermost part of a transfer apparatus when a lift is located at an upper limit of a lifting range; a lifting height acquiring unit configured to acquire lifting height information that indicates a lifting height, which is a height of the lift, at a plurality of points in time; and a transfer control unit configured to control the transfer apparatus. The transfer control unit converts the reference swaying amount detected by the sway detection unit into a lifting height swaying amount that is a swaying amount of the mast at the lifting height indicated by the lifting height information.

3 Claims, 6 Drawing Sheets

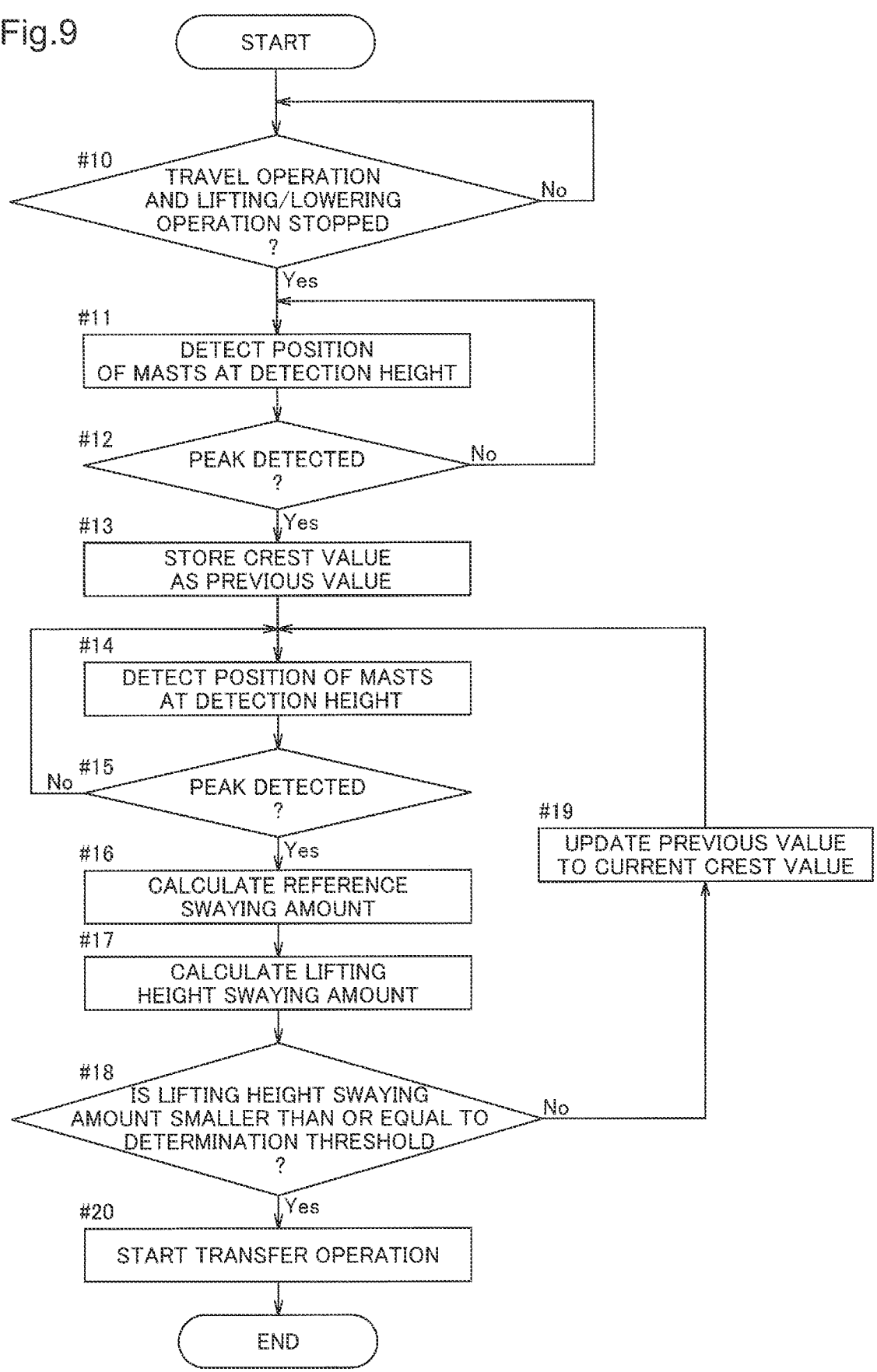

ness in Patent
STACKER CRANE CONTROL SYSTEM

CROSS-REFERENCE TO RELATED APPLICATION

This application claims priority to Japanese Patent Application No. 2021-007749 filed Jan. 21, 2021, the disclosure of which is hereby incorporated by reference in its entirety.

BACKGROUND OF THE INVENTION

1. Field of the Invention

The present invention relates to a stacker crane control system for controlling a stacker crane.

2. Description of the Related Art

An example of such a stacker crane control system is disclosed in Japanese Examined Patent Publication H04-22801 (Patent Document 1). Hereinafter, in "Description of the Related Art", the reference numerals and names in Patent Document 1 are cited in parentheses.

The stacker crane control system of Patent Document 1 detects parameters that affect swaying of a stacker crane (1) before the stacker crane (1) stops, and estimates, based on the detected parameters, a swaying state that the stacker crane (1) will enter after it is stopped. Then, the stacker crane control system determines the waiting time until the estimated swaying state has an allowable swaying amount or less, and controls a transfer apparatus (fork apparatus (8)) to operate immediately once the waiting time has elapsed. Here, the weight of a lift (7) that includes an article (package (13)), and the lifting height of the lift (7) are used as the parameters that affect swaying of the stacker crane (1).

SUMMARY OF THE INVENTION

However, in the technique disclosed in Patent Document 1, the swaying state of the stacker crane that is used to determine the waiting time is merely theoretically estimated based on parameters such as the weight or the lifting height of the lift, and may be different from the actual swaying state. Also, if the actual swaying amount is greater than the estimated swaying amount, there may be cases where an article cannot be appropriately transferred. On the other hand, if a longer waiting time is set in order to avoid such a situation, the start of the article transfer operation will be delayed, and the operation efficiency of the stacker crane will be reduced.

Also, even if the actual swaying amount of the stacker crane is detected in order to avoid such situations, the swaying amount of the transfer apparatus varies according to the lifting height of the lift that varies with time, and thus a large number of sensors are required to detect the actual swaying amount along the entire height of the lift. In this case, an increase in the installation cost of the stacker crane is unavoidable.

Thus, there is a demand for realizing a technique that avoids an increase in the installation cost of a stacker crane, and can start a transfer operation at an appropriate time based on an actual swaying amount of the stacker crane.

According to the present disclosure, a stacker crane control system for controlling a stacker crane including: a travel carriage that travels along a travel route; a mast supported on the travel carriage in an orientation along a vertical direction; a lift that moves up and down within a predetermined lifting range along the mast; a lifting apparatus that raises and lowers the lift; and a transfer apparatus supported by the lift and including a holding unit for holding an article, the stacker crane being configured to perform a transfer operation of transferring the article between the holding unit and a transfer destination, the stacker crane control system including: a sway detection unit configured to detect a reference swaying amount that is a swaying amount of the mast at a detection height, the detection height being set greater than or equal to the height of a lowermost part of the transfer apparatus when the lift is located at an upper limit of the lifting range; a lifting height acquiring unit configured to acquire lifting height information that indicates a lifting height, which is the height of the lift, at a plurality of points in time; and a transfer control unit configured to control the transfer apparatus, wherein the transfer control unit converts the reference swaying amount detected by the sway detection unit into a lifting height swaying amount that is a swaying amount of the mast at the lifting height indicated by the lifting height information, and starts the transfer operation of the transfer apparatus if the lifting height swaying amount is stably smaller than or equal to a predetermined determination threshold.

According to the present configuration, it is possible to obtain a lifting height swaying amount that is a swaying amount of the mast at the actual lifting height, based on an actual swaying amount of the mast that is detected by the sway detection unit, and an actual lifting height of the lift at each point in time that is acquired by the lifting height acquiring unit. Then, if the lifting height swaying amount is stably smaller than or equal to a predetermined determination threshold, the transfer operation of the transfer apparatus is started. Since the transfer operation is started in this way based on a detection result of the actual swaying amount of the mast, the transfer operation of the transfer apparatus can be started at an appropriate time according to the actual swaying amount of the mast that varies depending on various operation conditions.

Further features and advantages of the stacker crane control system will become apparent from the following description of embodiments given with reference to the drawings.

BRIEF DESCRIPTION OF THE DRAWINGS

FIG. 9 is a flowchart illustrating processing for determining the start of a transfer operation according to a second embodiment.

DETAILED DESCRIPTION OF PREFERRED EMBODIMENTS

First Embodiment

The following will describe a first embodiment of a stacker crane control system with reference to the drawings (FIGS. 1 to 8). The description is given taking an example where the stacker crane control system according to the present disclosure is applied to an article transport facility as exemplified in FIG. 1. Note that, in the present embodiment, a control system 1 corresponds to the "stacker crane control system".

Figure 1:
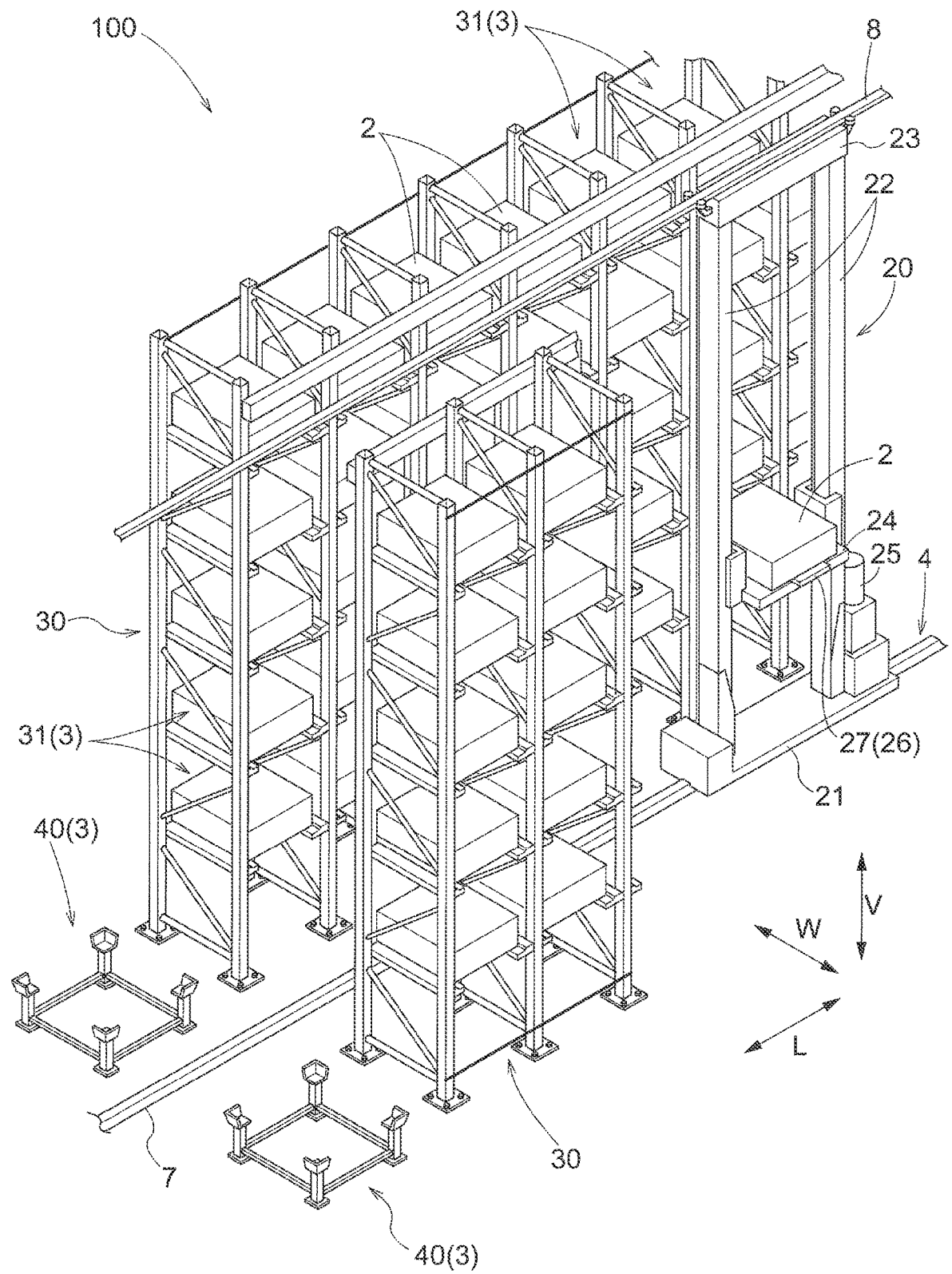
FIG. 1 is a perspective view illustrating part of an article transport facility.

As shown in FIG. 1, a stacker crane 20 that is controlled by the control system 1 (see FIG. 2) includes a travel carriage 21, masts 22, a lift 24, a lifting apparatus 25, and a transfer apparatus 26. The travel carriage 21 travels along a travel route 4. The travel operation of the travel carriage 21 is controlled by a later-described travel control unit 16 (see FIG. 2). The travel control unit 16 controls driving of a travel drive unit (for example, an electric motor such as a servomotor) included in the travel carriage 21 so as to control the travel operation of the travel carriage 21. Here, the longitudinal direction of the travel route 4 (direction in which the travel route 4 extends) is defined as the "route longitudinal direction L", and the width direction of the travel route 4 is defined as the "route width direction W". The route width direction W refers to a direction that is orthogonal to both the route longitudinal direction L and a vertical direction V. In the present embodiment, the route longitudinal direction L corresponds to a "direction along the travel route".

As shown in FIG. 1, the travel route 4 is formed of a travel rail 7. The travel rail 7 is provided on a floor part 5 (see FIG. 3). The travel carriage 21 includes travel wheels that roll on a travel surface of the travel rail 7, and as a result of the travel wheels being driven to rotate by the travel drive unit, the travel carriage 21 travels along the travel rail 7. Note that, in FIG. 3, the stacker crane 20 is shown in a simplified manner, and the travel rail 7 provided on the floor part 5 and a later-described guide rail 8 provided on a ceiling part 6 are omitted.

Figure 3:
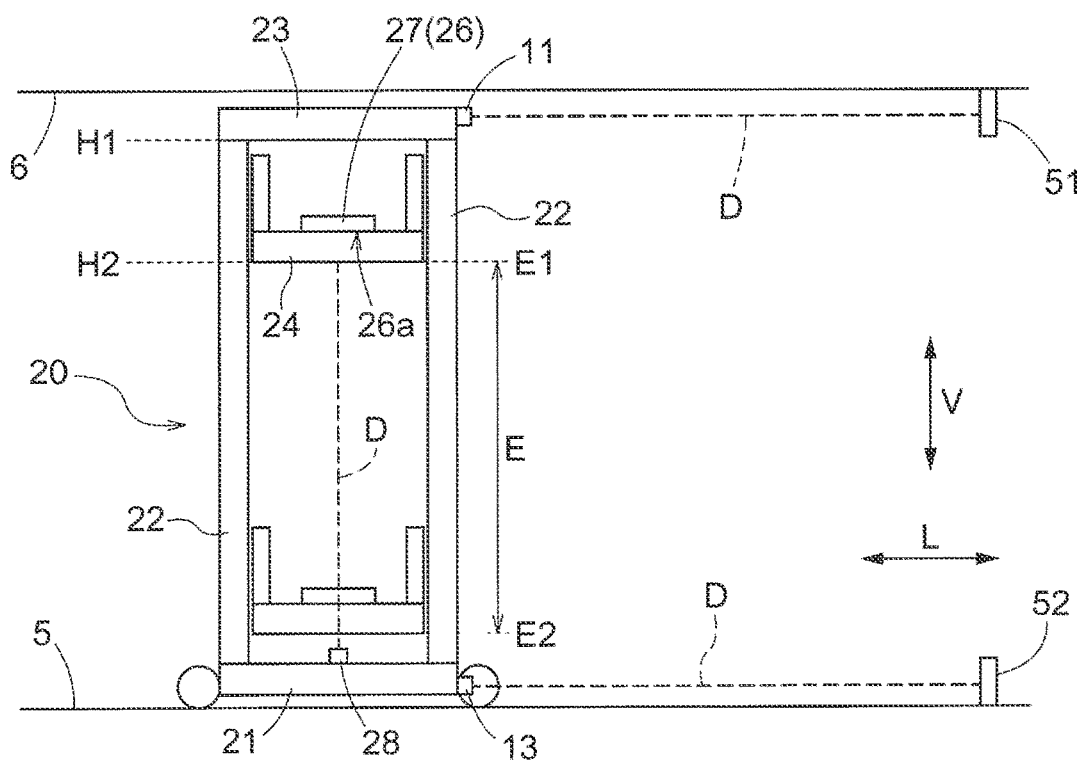
FIG. 3 is a schematic side view illustrating a stacker crane.

As shown in FIGS. 1 and 3, the masts 22 are supported on the travel carriage 21 in an orientation along the vertical direction V. The masts 22 stand upright from the travel carriage 21 so as to extend upward from the travel carriage 21. In the present embodiment, two masts 22 are supported on the travel carriage 21 while being lined up in the route longitudinal direction L. Upper end portions of the two masts 22 are coupled to each other by a connection part 23 such as an upper frame. The connection part 23 includes guide wheels that are guided by the guide rail 8 provided on the ceiling side such as the ceiling part 6, and the connection part 23 moves in the route longitudinal direction L while being guided by the guide rail 8.

The lifting apparatus 25 raises and lowers the lift 24. The operation performed by the lifting apparatus 25 to raise and lower the lift 24 is controlled by a later-described lifting control unit 17 (see FIG. 2). The lifting control unit 17 controls driving of a lifting drive unit (for example, an electric motor such as a servomotor) included in the lifting apparatus 25 so as to control the operation performed by the lifting apparatus 25 to raise and lower the lift 24. The lifting apparatus 25 raises or lowers the lift 24 by, for example, using driving by the lifting drive unit to rotate a wind-up drum on which a wire connected to the lift 24 is wound, so that the wire is wound up or unwound.

The lift 24 moves up and down in a predetermined lifting range E (see FIG. 3) that extends along the masts 22. The lift 24 moves up and down between an upper limit E1 and a lower limit E2 of the lifting range E. The lift 24 includes guide wheels that are guided by the masts 22, and moves up and down along the masts 22 while being guided by the masts 22. In the present embodiment, the lift 24 moves up and down in a state of being arranged between the two masts 22 lined up in the route longitudinal direction L. The lift 24 is suspended by a wire and moves up and down along the masts 22.

The transfer apparatus 26 is supported by the lift 24. As shown in FIGS. 1 and 3, the transfer apparatus 26 includes a holding unit 27 for holding an article 2, and performs a transfer operation of transferring the article 2 between the holding unit 27 and a transfer destination 3. When the transfer apparatus 26 is located at a position that corresponds to a transfer destination 3 (specifically, a position at which the transfer apparatus 26 faces the transfer destination 3 in the route width direction W) according to the travel operation of the travel carriage 21 and the operation of raising and lowering the lift 24, the transfer apparatus 26 performs the transfer operation. In the present embodiment, the holding unit 27 supports the article 2 (specifically, a central portion of the article 2 in the route longitudinal direction L) from below to hold the article 2. In other words, the article 2 is placed on and supported by the holding unit 27. The operation performed by the transfer apparatus 26 to transfer the article 2 is controlled by a later-described transfer control unit 18 (see FIG. 2). The transfer control unit 18 controls driving of a transfer drive unit (for example, an electric motor such as a servomotor) included in the transfer apparatus 26 so as to control the transfer operation of the transfer apparatus 26.

In the present embodiment, the transfer apparatus 26 is configured to advance and retract the holding unit 27 in the route width direction W (advancing movement away from the lift 24, and retracting movement toward the lift 24). As a result of the operation performed by the transfer apparatus 26 to advance and retract the holding unit 27, and the operation performed by the lifting apparatus 25 to raise and lower the lift 24, the article 2 is transferred between the holding unit 27 and the transfer destination 3. That is to say, in the present embodiment, the transfer operation of the transfer apparatus 26 is the operation of advancing and retracting the holding unit 27, and through cooperation between the transfer apparatus 26 and the lifting apparatus 25 (specifically, by performing the operation of raising and lowering the lift 24 in accordance with the transfer operation of the transfer apparatus 26), the article 2 is transferred between the holding unit 27 and the transfer destination 3.

Specifically, when transferring the article 2 from the holding unit 27 to the transfer destination 3, the transfer apparatus 26 performs the transfer operation and the lifting apparatus 25 performs the operation of raising and lowering the lift 24, such that the holding unit 27 that holds the article 2 is advanced from a retracted position (position at which the holding unit 27 is retracted to the lift 24) to an advanced position (position at which the holding unit 27 is advanced to the transfer destination 3), then the lift 24 is lowered, and then the holding unit 27 is retracted from the advanced position to the retracted position. With this, the article 2 is unloaded from the holding unit 27 to the transfer destination 3, and thus the article 2 is transferred from the holding unit 27 to the transfer destination 3. Also, when transferring the article 2 from the transfer destination 3 to the holding unit 27, the transfer apparatus 26 performs the transfer operation and the lifting apparatus 25 performs the operation of raising and lowering the lift 24 such that the holding unit 27 not holding any article 2 is advanced from the retracted position to the advanced position, then the lift 24 is raised, and then the holding unit 27 is retracted from the advanced position to the retracted position. With this, the article 2 is scooped by the holding unit 27, and thus the article 2 is transferred from the transfer destination 3 to the holding unit 27.

As shown in FIG. 1, an article transport facility 100 includes at least one storage rack 30. The storage rack 30 is arranged in an orientation such that its rack width direction matches the route longitudinal direction L and its rack depth direction matches the route width direction W. The travel route 4 is provided on the front side of the storage rack 30 (on the side on which the article 2 is loaded to and unloaded from the storage rack 30). The storage rack 30 includes a plurality of storage spaces 31 for storing articles 2. The plurality of storage spaces 31 are arranged in multiple rows in the vertical direction V and multiple columns in the route longitudinal direction L. In the example shown in FIG. 1, each article 2 is stored in a storage space 31 with its side portions in the route longitudinal direction L supported from below. In the example shown in FIG. 1, the storage racks 30 are provided on both sides of the travel route 4 in the route width direction W. In the present embodiment, the storage spaces 31 are included in the transfer destination 3. The storage spaces 31 serve as transfer destinations 3 set at a plurality of positions determined in the route longitudinal direction L and the vertical direction V.

The article transport facility 100 includes a support unit 40 for supporting an article 2 (in the example shown in FIG. 1, a pair of support units 40 that face each other in the route width direction W with the travel route 4 interposed therebetween). The support unit 40 is used as a loading unit that supports an article 2 to be loaded to the storage rack 30. Also, the support unit 40 is used as an unloading unit that supports an article 2 unloaded from the storage rack 30. In the present embodiment, the support units 40 are included in the transfer destination 3.

Figure 2:
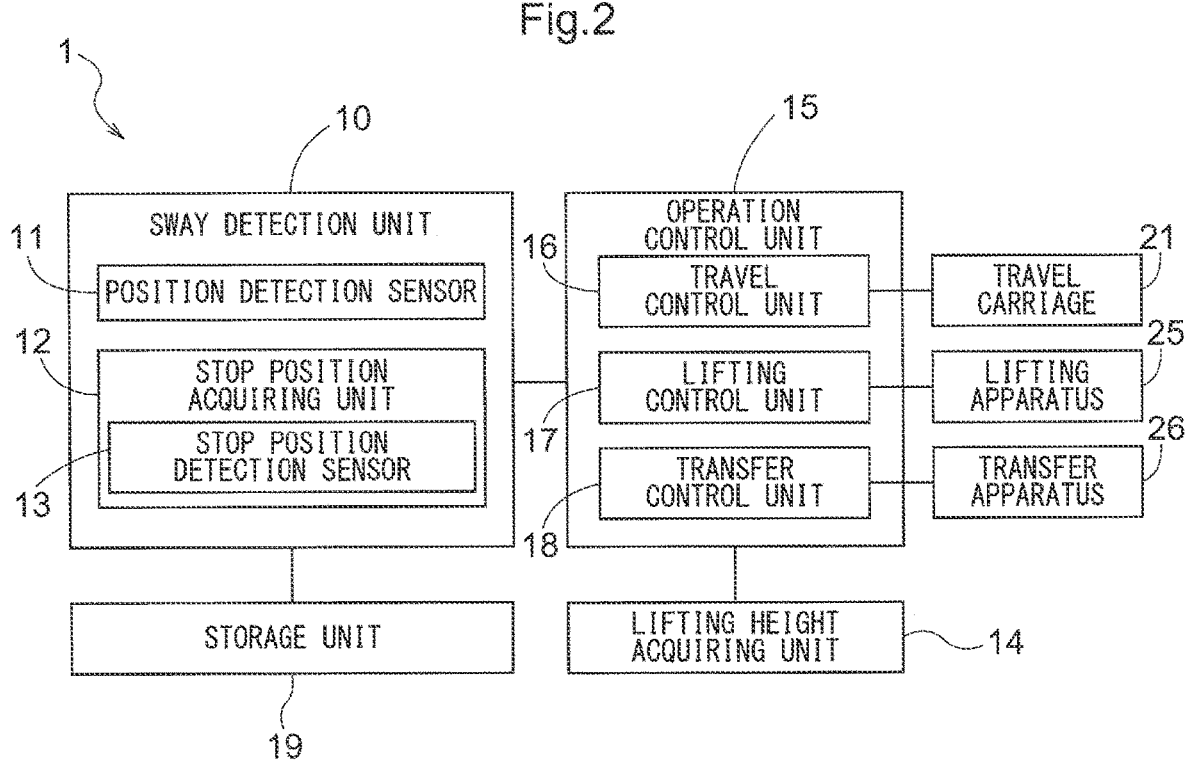
FIG. 2 is a control block diagram.

As shown in FIG. 2, the control system 1 includes an operation control unit 15 for controlling the operation of the stacker crane 20. The control system 1 includes, in addition to the operation control unit 15, a sway detection unit 10, a lifting height acquiring unit 14, and a storage unit 19, which will be described in detail later. The functions of the control system 1 (specifically, the functions of the sway detection unit 10, the lifting height acquiring unit 14, and the operation control unit 15) are realized by cooperation between hardware such as an arithmetic processing unit, and a program executed on the hardware. The storage unit 19 includes, for example, a storage medium such as a flash memory or a hard disk.

The plurality of constituent components of the control system 1 are configured to be able to exchange information with each other. Note that the constituent components of the control system 1 shown in FIG. 2 are distinguished from each other at least logically, but do not need to be physically distinguished from each other. Also, the constituent components of the control system 1 may be provided on the stacker crane 20 (for example, on a device controller included in the stacker crane 20) or may be provided independently from the stacker crane 20. Some of the constituent components of the control system 1 may be provided on the stacker crane 20, and the remaining constituent components of the control system 1 may be provided independently from the stacker crane 20.

The operation control unit 15 includes the travel control unit 16, the lifting control unit 17, and the transfer control unit 18. The travel control unit 16 controls the travel operation of the travel carriage 21, the lifting control unit 17 controls the operation performed by the lifting apparatus 25 to raise and lower the lift 24, and the transfer control unit 18 controls the transfer operation of the transfer apparatus 26. In the present embodiment, as a result of the transfer control unit 18 controlling the transfer operation of the transfer apparatus 26 and the lifting control unit 17 controlling the operation performed by the lifting apparatus 25 to raise and lower the lift 24, the article 2 is transferred between the holding unit 27 and the transfer destination 3.

In response to an instruction from a superordinate control unit or the like, the operation control unit 15 controls the stacker crane 20 to perform a loading operation of loading an article 2 into a storage space 31, or an unloading operation for unloading an article 2 from a storage space 31.

When the operation control unit 15 controls the stacker crane 20 to load the article 2, the travel control unit 16 controls the travel operation of the travel carriage 21 such that the transfer apparatus 26 is located at a position that corresponds to the support unit 40 (specifically, a position at which the transfer apparatus 26 faces the support unit 40 in the route width direction W), and the lifting control unit 17 controls the lifting apparatus 25 to raise and lower the lift 24. Then, the transfer control unit 18 controls the transfer operation of the transfer apparatus 26 such that the article 2 is transferred from the support unit 40 to the holding unit 27. Then, the travel control unit 16 controls the travel operation of the travel carriage 21 such that the transfer apparatus 26 is located at a position that corresponds to the storage space 31 serving as the loading destination for the article 2 (specifically, a position at which the transfer apparatus 26 faces the storage space 31 in the route width direction W), and the lifting control unit 17 controls the lifting apparatus 25 to raise and lower the lift 24. Then, the transfer control unit 18 controls the transfer operation of the transfer apparatus 26 such that the article 2 is transferred from the holding unit 27 to the storage space 31.

Also, when the operation control unit 15 controls the stacker crane 20 to unload the article 2, the travel control unit 16 controls the travel operation of the travel carriage 21 such that the transfer apparatus 26 is located at a position that corresponds to the storage space 31 in which the article 2 is stored, and the lifting control unit 17 controls the lifting apparatus 25 to raise and lower the lift 24. Then, the transfer control unit 18 controls the transfer operation of the transfer apparatus 26 such that the article 2 is transferred from the storage space 31 to the holding unit 27. Then, the travel control unit 16 controls the travel operation of the travel carriage 21 such that the transfer apparatus 26 is located at a position that corresponds to the support unit 40, and the lifting control unit 17 controls the lifting apparatus 25 to raise and lower the lift 24. Then, the transfer control unit 18 controls the transfer operation of the transfer apparatus 26 such that the article 2 is transferred from the holding unit 27 to the support unit 40.

In the present embodiment, the travel carriage 21 is controlled so as to be stopped at reference stop positions S (see FIG. 6) that are preset at a plurality of locations in the route longitudinal direction L. A reference stop position S is set for each transfer destination 3. Each reference stop position S is set such that, when the travel carriage 21 is stopped at the reference stop position S, the lift 24 can be located at a position that corresponds to a transfer destination 3 (the transfer destination 3 set for the reference stop position 5). A common reference stop position S may be set at a plurality of transfer destinations 3 located at the same level in the route longitudinal direction L. For example, also when there is a small position shift in the route longitudinal direction L between a plurality of storage spaces 31 that belong to the same column, a common reference stop position S may be set for the plurality of storage spaces 31 that belong to the same column.

Figure 4:
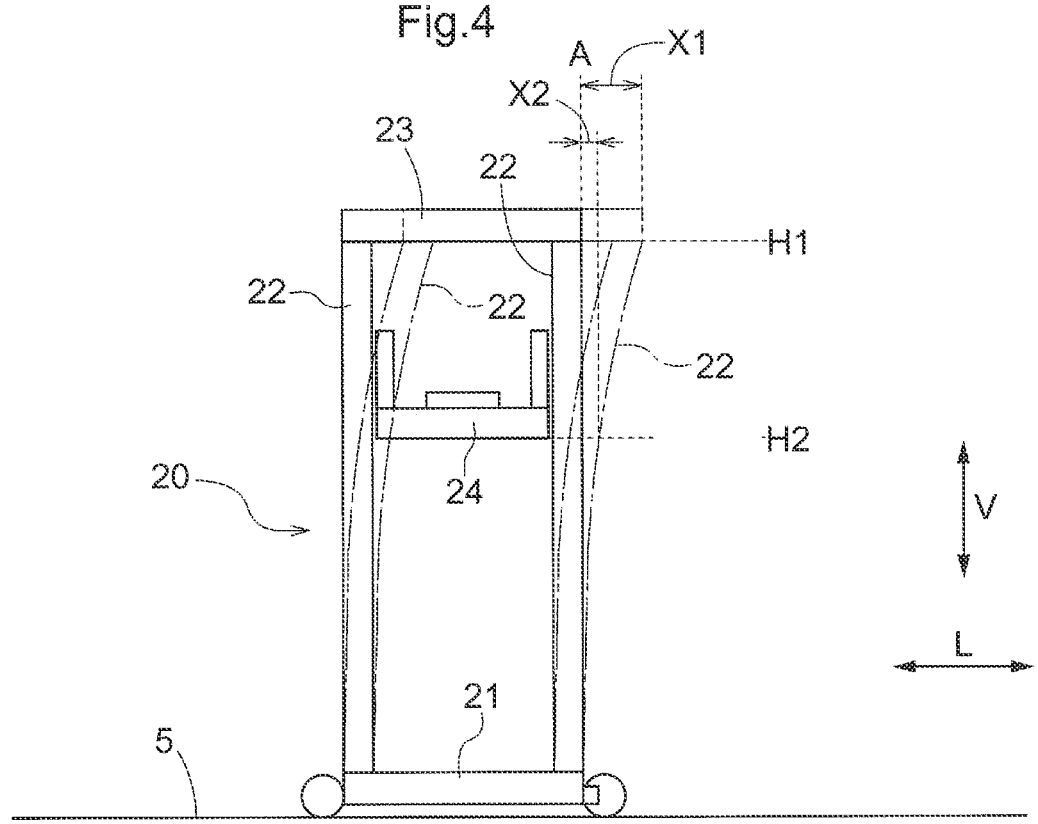
FIG. 4 is a diagram schematically illustrating swaying of masts after a travel carriage is stopped.

Meanwhile, as schematically shown in FIG. 4, the masts 22 sway with their portions connected to the travel carriage 21 (i.e., lower ends of the masts 22) serving as fulcrums for a while after the travel carriage 21 is stopped, due to inertia that occurs when the travel carriage 21 decelerates. In response to the swaying of the masts 22, the lift 24 and the transfer apparatus 26 supported by the lift 24 sway in the route longitudinal direction L. Note that, in FIG. 4, the stacker crane 20 in a static state in which the swaying of the masts 22 is stopped and the masts 22 are standing still is indicated by solid lines, and the masts 22 in a state in which the masts 22 are bent to one side (to the right in the drawing) in the route longitudinal direction L with respect to the static state are indicated by dotted lines. The masts 22 change to the static state while bending to both sides in the route longitudinal direction L with respect to the static state.

In order to prevent a decrease in the operation efficiency of the stacker crane 20, it is desirable that, for example, the transfer operation can be started as soon as possible when the swaying amount is in a range in which no failure will occur in the transfer operation of the transfer apparatus 26. In the present embodiment, by configuring the control system 1 in the following manner, it is possible to start the transfer operation at an appropriate time based on the actual swaying amount of the stacker crane 20 (it is possible to start the transfer operation as soon as possible when the swaying amount is in a range in which no failure will occur in the transfer operation of the transfer apparatus 26), while suppressing an increase in the installation cost of the stacker crane 20.

As shown in FIG. 2, the control system 1 includes the sway detection unit 10, the lifting height acquiring unit 14, and the above-described transfer control unit 18 for controlling the transfer apparatus 26. In the present embodiment, the control system 1 further includes the storage unit 19. In the present embodiment, the sway detection unit 10 includes a position detection sensor 11 and a stop position acquiring unit 12. In the present embodiment, the stop position acquiring unit 12 includes a stop-position detection sensor 13.

The sway detection unit 10 detects a reference swaying amount X1 (see FIGS. 4 and 5), which is a swaying amount X of the masts 22 at a detection height H1. Here, as shown in FIG. 3, the detection height H1 is set to at least the height of a lowermost part 26a of the transfer apparatus 26 when the lift 24 is located at the upper limit E1 of the lifting range E. In the example shown in FIG. 4, the detection height H1 is set to the height of the upper ends (uppermost parts) of the masts 22. In the present embodiment, the swaying amount X is the amount of swaying in the route longitudinal direction L, although the swaying amount X may include, in addition to the swaying amount in the route longitudinal direction L, the swaying amount in the vertical direction V.

As shown in FIGS. 2 and 3, in the present embodiment, the sway detection unit 10 includes the position detection sensor 11 that dynamically detects the positions of the masts 22 at the detection height H1 in the route longitudinal direction L. As shown in FIG. 3, in the present embodiment, the position detection sensor 11 is an optical distance detection sensor. The position detection sensor 11 projects detection light D toward a first reflective plate 51, and receives light reflected from the first reflective plate 51, thereby detecting the distance between the position detection sensor 11 and the first reflective plate 51. Based on the distance between the position detection sensor 11 and the first reflective plate 51, the positions of the masts 22 at the detection height H1 in the route longitudinal direction L are derived.

Either the position detection sensor 11 or the first reflective plate 51 (in the example shown in FIG. 3, the first reflective plate 51) is fixed to a portion whose position in the route longitudinal direction L does not change, such as the ceiling part 6. The remaining one of the position detection sensor 11 and the first reflective plate 51 (in the example shown in FIG. 3, the position detection sensor 11) is fixed to a fixation target portion of the stacker crane 20. The fixation target portion is a portion that sways with the same swaying amount as the swaying amount X of the portion of the mast 22 (in the example of FIG. 4, the upper end of the mast 22) that is located at the detection height H1. In the example shown in FIG. 3, the position detection sensor 11 is fixed to the connection part 23 serving as the fixation target portion. Note that the position detection sensor 11 may be a sensor (e.g., a rotary encoder) other than an optical distance detection sensor.

Figure 5:
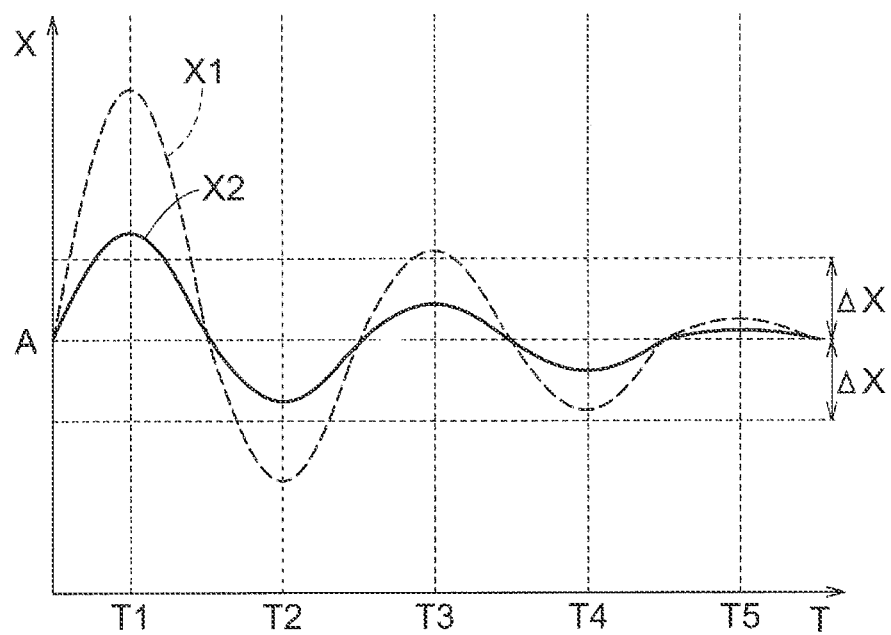
FIG. 5 is a diagram schematically illustrating temporal changes in a reference swaying amount and a lifting height swaying amount.

As shown in FIG. 5 that shows changes in the swaying amounts X of the masts 22 relative to time T, after the travel carriage 21 is stopped, the masts 22 vibrates around a reference position A, which is a position in the static state, and the vibration attenuates. In the present embodiment, the sway detection unit 10 detects a difference between the reference position A and a detection result of the position detection sensor 11, as the reference swaying amount X1. The method for deriving the reference position A will be described later.

The lifting height acquiring unit 14 acquires lifting height information that indicates a lifting height 112. Here, the lifting height H2 is a height (position in the vertical direction V) of the lift 24 at each point in time, as shown in FIGS. 3 and 4. The lifting height H2 varies between the upper limit E1 and the lower limit E2 of the lifting range E of the lift 24. The lifting height acquiring unit 14 includes a height detection sensor 28 that detects the height of the lift 24, and acquires a detection result of the height detection sensor 28 as lifting height information. A sensor that is used when the lifting control unit 17 controls the operation of raising and lowering the lift 24 may also be used as the height detection sensor 28, or another sensor may be used as the height detection sensor 28.

As shown in FIG. 3, in the present embodiment, the height detection sensor 28 is an optical distance detection sensor. In the example shown in FIG. 3, the height detection sensor 28 is fixed to a part of the stacker crane 20 whose position in the vertical direction V does not change. Then, the height detection sensor 28 projects detection light D toward the lift 24 (specifically, a reflective plate provided on the lift 24), and receives light reflected from the lift 24, thereby detecting the distance between the height detection sensor 28 and the lift 24. Based on the distance between the height detection sensor 28 and the lift 24, the height of the lift 24 is derived. In contrast to this configuration, a configuration is also possible in which the height detection sensor 28 is provided on the lift 24. Also, the height detection sensor 28 may be a sensor (e.g., a rotary encoder) other than an optical distance detection sensor.

The transfer control unit 18 converts the reference swaying amount X1 detected by the sway detection unit 10 into a lifting height swaying amount X2 (see FIGS. 4 and 5), which is a swaying amount X of the masts 22 at the lifting height H2 that is indicated by the lifting height information. The lifting height swaying amount X2 corresponds to the swaying amount of the lift 24. That is to say, the transfer control unit 18 converts the swaying amount X of the masts 22 at the detection height H1 into the swaying amount of the lift 24. The conversion from the reference swaying amount X1 into the lifting height swaying amount X2 can be made based on, for example, a vibration model that approximates the displacement using a cubic function. In this case, the transfer control unit 18 can obtain the lifting height swaying amount X2 from the reference swaying amount X1 based on the following expression (1).

$$X2 = X1(H2/H1)^3 \tag{1}$$

The conversion from the reference swaying amount X1 into the lifting height swaying amount X2 can also be made based on, for example, a vibration model that approximates the displacement using a linear function. In this case, the transfer control unit 18 can obtain the lifting height swaying amount X2 from the reference swaying amount X1 based on the following expression (2).

$$X2 = X1(H2/H1) \tag{2}$$

Note that the detection height H1 and the lifting height H2 (height of the lift 24) in these expressions refer to heights from a common reference height, which can be the height of the connection part that connects the masts 22 and the travel carriage 21 (i.e., lower ends of the masts 22).

The transfer control unit 18 performs the above-described conversion using an amplitude of swaying of the masts 22 at the detection height H1 (amplitude with the reference position A used as a reference) as the reference swaying amount X1. Therefore, the lifting height swaying amount X2 derived by the transfer control unit 18 indicates the amplitude (crest value) of swaying of the masts 22 at the lifting height 112. Accordingly, in the expressions (1) and (2), the reference swaying amount X1 is an amplitude of swaying of the masts 22 at the detection height H1, and the lifting height swaying amount X2 is an amplitude of swaying of the masts 22 at the lifting height 112.

The sway detection unit 10 acquires the reference swaying amount X1 repeatedly, and detects an amplitude of the swaying of the masts 22 at the detection height H1 based on time-series data of the reference swaying amount X1. The sway detection unit 10 subjects the time-series data of the reference swaying amount X1 to differential processing or the like to detect a peak of the swaying of the masts 22 (peak in vibration waveform), and detects the (absolute) value of the reference swaying amount X1 at the peak as the amplitude of the swaying of the masts 22 at the detection height H1. A peak of swaying of the masts 22 appears at a period of half of the natural period of the swaying of the masts 22, and in the example shown in FIG. 5, peaks of the swaying of the masts 22 appear at time T1, time T2, time T3, time T4, and time T5. The transfer control unit 18 converts the amplitude of the swaying of the masts 22 at the detection height H1 that was detected by the sway detection unit 10 in this way into the amplitude of the swaying of the masts 22 at the lifting height 112.

As described above, the transfer control unit 18 derives the lifting height swaying amount X2 by converting the reference swaying amount X1 into the lifting height swaying amount X2. Then, the transfer control unit 18 starts the transfer operation of the transfer apparatus 26 if the lifting height swaying amount X2 is stably smaller than or equal to a predetermined determination threshold ΔX. In this context, "stably" means a period of predetermined determination time or longer. As described above, in the present embodiment, by performing the above-described conversion, the transfer control unit 18 derives the amplitude of swaying of the masts 22 at the lifting height 112 as the lifting height swaying amount X2. Then, if the derived lifting height swaying amount X2 is smaller than or equal to the predetermined determination threshold ΔX, the transfer control unit 18 determines that the lifting height swaying amount X2 is stably smaller than or equal to the predetermined determination threshold ΔX, and starts the transfer operation of the transfer apparatus 26. In this case, if the lifting height swaying amount X2 is smaller than or equal to the predetermined determination threshold ΔX for at least a quarter of the above-described natural period, it is determined that the lifting height swaying amount X2 is stably smaller than or equal to the predetermined determination threshold ΔX. In the example shown in FIG. 5, at the time T2, the lifting height swaying amount X2 is determined as being stably smaller than or equal to the predetermined determination threshold ΔX.

In this way, the transfer control unit 18 regards the lifting height swaying amount X2 as the swaying amount of the transfer apparatus 26 supported by the lift 24, and determines whether or not to start the transfer operation of the transfer apparatus 26. The above-described determination threshold ΔX is preferably set to a value as large as possible within a range in which no failure will occur in the transfer operation of the transfer apparatus 26. Also, the determination threshold ΔX is preferably set taking into consideration the connection relationship or positional relationship between the lift 24 and the transfer apparatus 26 (taking into consideration that, for example, sway may be amplified at the connection part that connects the lift 24 and the transfer apparatus 26).

As described above, in the present embodiment, the sway detection unit 10 detects a difference between the reference position A and a detection result of the position detection sensor 11, as the reference swaying amount X1. The following will describe the method for deriving the reference position A that is performed in the control system 1 of the present embodiment.

Figure 6:
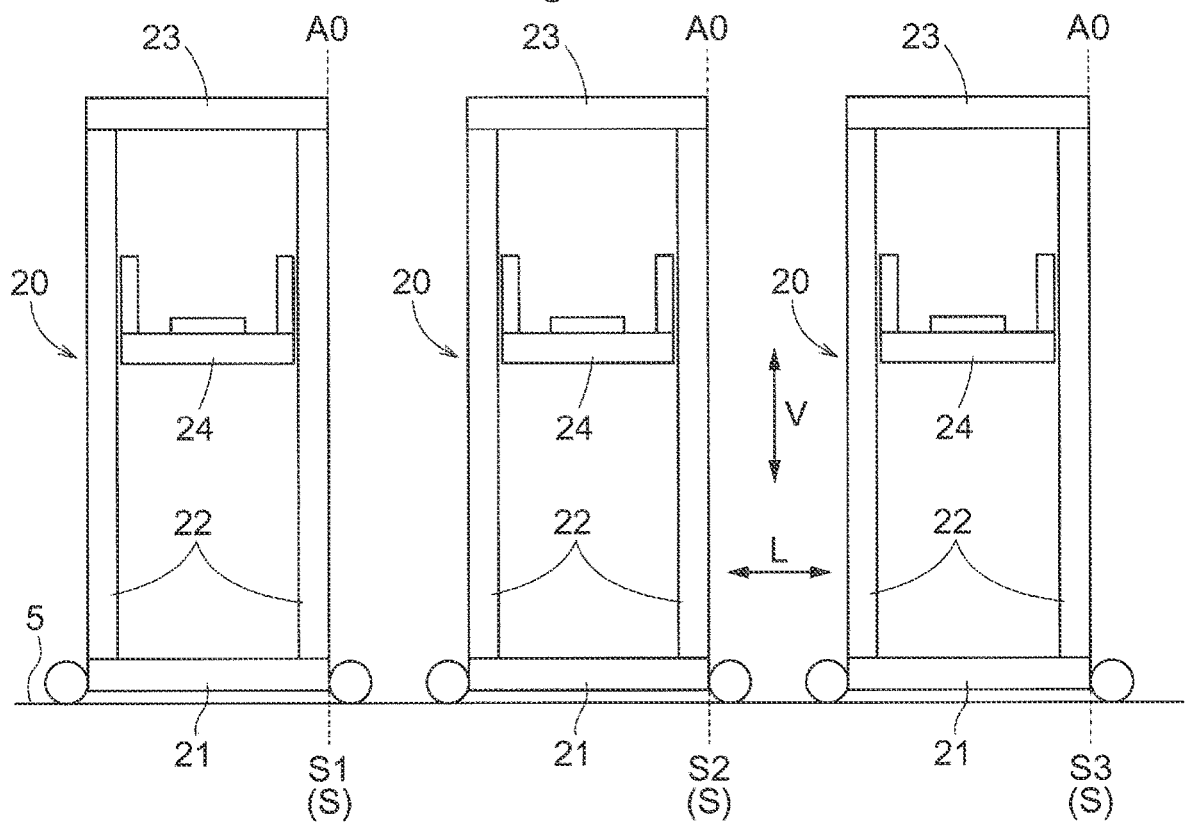
FIG. 6 illustrates a mast reference position.

As described above, in the present embodiment, the travel carriage 21 is controlled so as to be stopped at the reference stop positions S (see FIG. 6) that are preset at a plurality of locations in the route longitudinal direction L. In the present embodiment, the control system 1 includes the storage unit 19 (see FIG. 2) in which information regarding a mast reference position A0 measured when the travel carriage 21 is stopped at each of a plurality of reference stop positions S is stored, the mast reference position A0 being a position of the masts 22 at the detection height H1 in a state in which the travel carriage 21 is stopped at the reference stop position S, and the masts 22 are standing still (are in the static state). Each piece of information regarding the mast reference position A0 is stored in the storage unit 19 in association with a reference stop position S (specifically, the reference stop position S at which the mast reference position A0 was measured). FIG. 6 shows the masts 22 and the mast reference position A0 in the static state at three reference stop positions S, namely, a first stop position S1, a second stop position S2, and a third stop position S3.

As shown in FIG. 6, the positional relationship between the reference stop position S and the mast reference position A0 in the route longitudinal direction L is common between a plurality of reference stop positions S, in terms of design. However, actually, the positional relationship may vary between the reference stop positions S due to a level difference (difference in height) of the travel rail 7, or the like. In this regard, in the present embodiment, since the travel carriage 21 is stopped at each of the plurality of reference stop positions S and the mast reference position A0 is measured as described above, the mast reference position A0 can be appropriately set for each of the plurality of reference stop positions S even if the above-described positional relationship varies between the reference stop positions S.

As shown in FIG. 2, the sway detection unit 10 includes the stop position acquiring unit 12 that acquires stop position information that indicates at which of the plurality of reference stop positions S the travel carriage 21 is stopped. The stop position acquiring unit 12 acquires the stop position information, for example, from the operation control unit 15 (specifically, the travel control unit 16). If the reference stop position S is set at a position common between a plurality of storage spaces 31 belonging to the same column, the stop position information is information that indicates, for example, at which column of the storage rack 30 the travel carriage 21 is stopped. The sway detection unit 10 acquires, from the storage unit 19, the mast reference position A0 associated with the reference stop position S indicated by the stop position information, and detects a difference between the mast reference position A0 and a detection result of the position detection sensor 11, as a reference swaying amount X1. That is to say, in this case, the mast reference position A0 serves as the above-described reference stop position A (see FIGS. 4 and 5).

Figure 7:
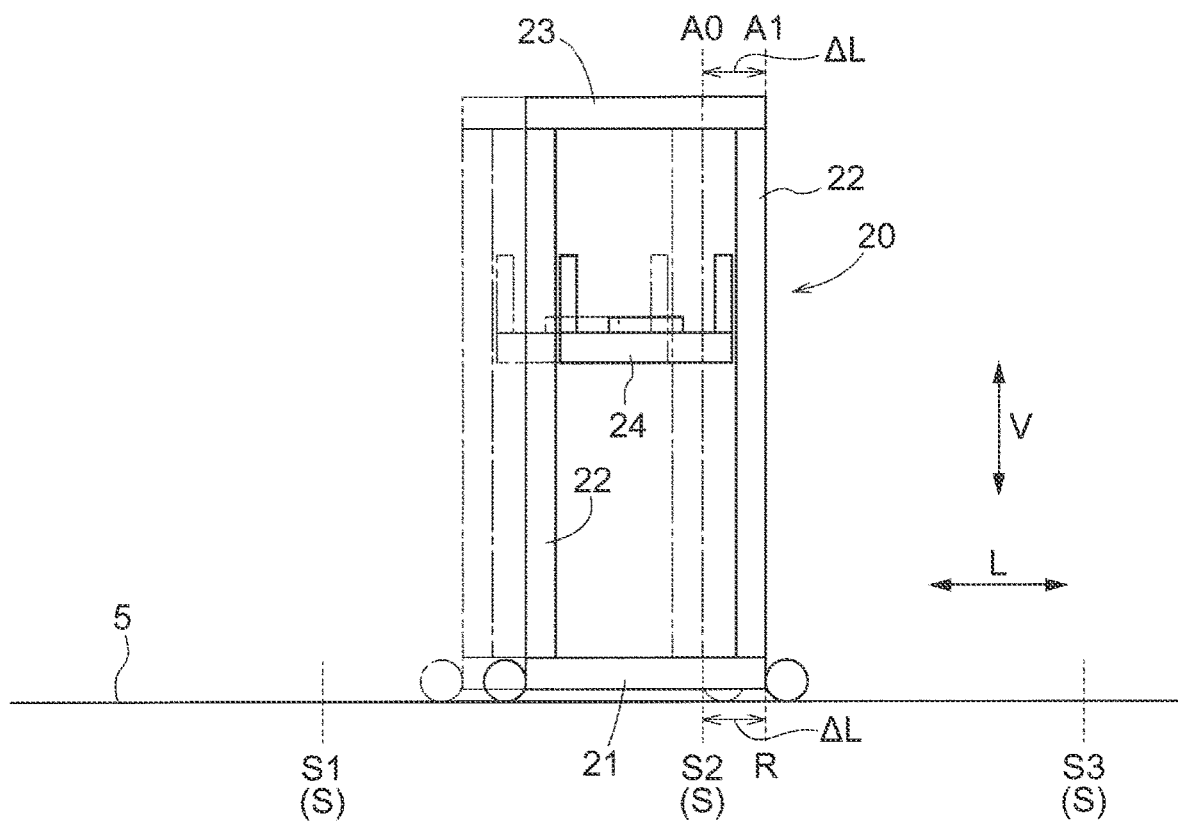
FIG. 7 illustrates a corrected mast reference position.

Meanwhile, if the travel carriage 21 is controlled to stop at the reference stop position S, an actual stop position R, which is a stop position at which the travel carriage 21 is actually stopped, may be shifted from the reference stop position S. FIG. 7 shows a situation in which the travel carriage 21 controlled so as to stop at the second stop position S2 is stopped at a position shifted from the second stop position S2 by a stop position error ΔL. Note that, in FIG. 7, the stop position error ΔL is exaggerated for ease of understanding. It is also possible to take into consideration this stop position error ΔL to correct the reference stop position S, which serves as a reference for use in detecting the reference swaying amount X1, as will be described below.

In the case where the reference stop position S is to be corrected, the stop position acquiring unit 12 includes the stop-position detection sensor 13 that detects the actual stop position R, as shown in FIG. 2. A sensor that is used when the travel control unit 16 controls the travel operation of the travel carriage 21 may also be used as the stop-position detection sensor 13, or another sensor may be used as the stop-position detection sensor 13.

As shown in FIG. 3, in the present embodiment, the stop-position detection sensor 13 is an optical distance detection sensor. The stop-position detection sensor 13 projects detection light D toward a second reflective plate 52, and receives light reflected from the second reflective plate 52, thereby detecting the distance between the stop-position detection sensor 13 and the second reflective plate 52. Based on the distance between the stop-position detection sensor 13 and the second reflective plate 52 in a state in which the travel carriage 21 is stopped, the actual stop position R is derived.

Either the stop-position detection sensor 13 or the second reflective plate 52 (in the example shown in FIG. 3, the second reflective plate 52) is fixed to a portion whose position in the route longitudinal direction L does not change, such as the floor part 5. The remaining one of the stop-position detection sensor 13 and the second reflective plate 52 (in the example shown in FIG. 3, the stop-position detection sensor 13) is fixed to the travel carriage 21. Note that the stop-position detection sensor 13 may be a sensor (e.g., a rotary encoder) other than an optical distance detection sensor.

The sway detection unit 10 obtains a corrected mast reference position A1 based on a detection result of the actual stop position R obtained by the stop-position detection sensor 13. Specifically, by correcting the mast reference position A0 based on a difference between the actual stop position R and the reference stop position S that corresponds to the actual stop position R, the sway detection unit 10 obtains the corrected mast reference position A1. In the example shown in FIG. 7, the difference between the actual stop position R and the reference stop position S (here, the second stop position S2) that corresponds to the actual stop position R is the stop position error ΔL, and the corrected mast reference position A1 is the position obtained by shifting the mast reference position A0 by the stop position error ΔL in the same direction as the direction of the shift of the actual stop position R from the reference stop position S. Also, the sway detection unit 10 detects a difference between the corrected mast reference position A1 and a detection result of the position detection sensor 11, as the reference swaying amount X1. That is to say, in this case, the corrected mast reference position A1 serves as the above-described reference stop position A (see FIGS. 4 and 5).

Figure 8:
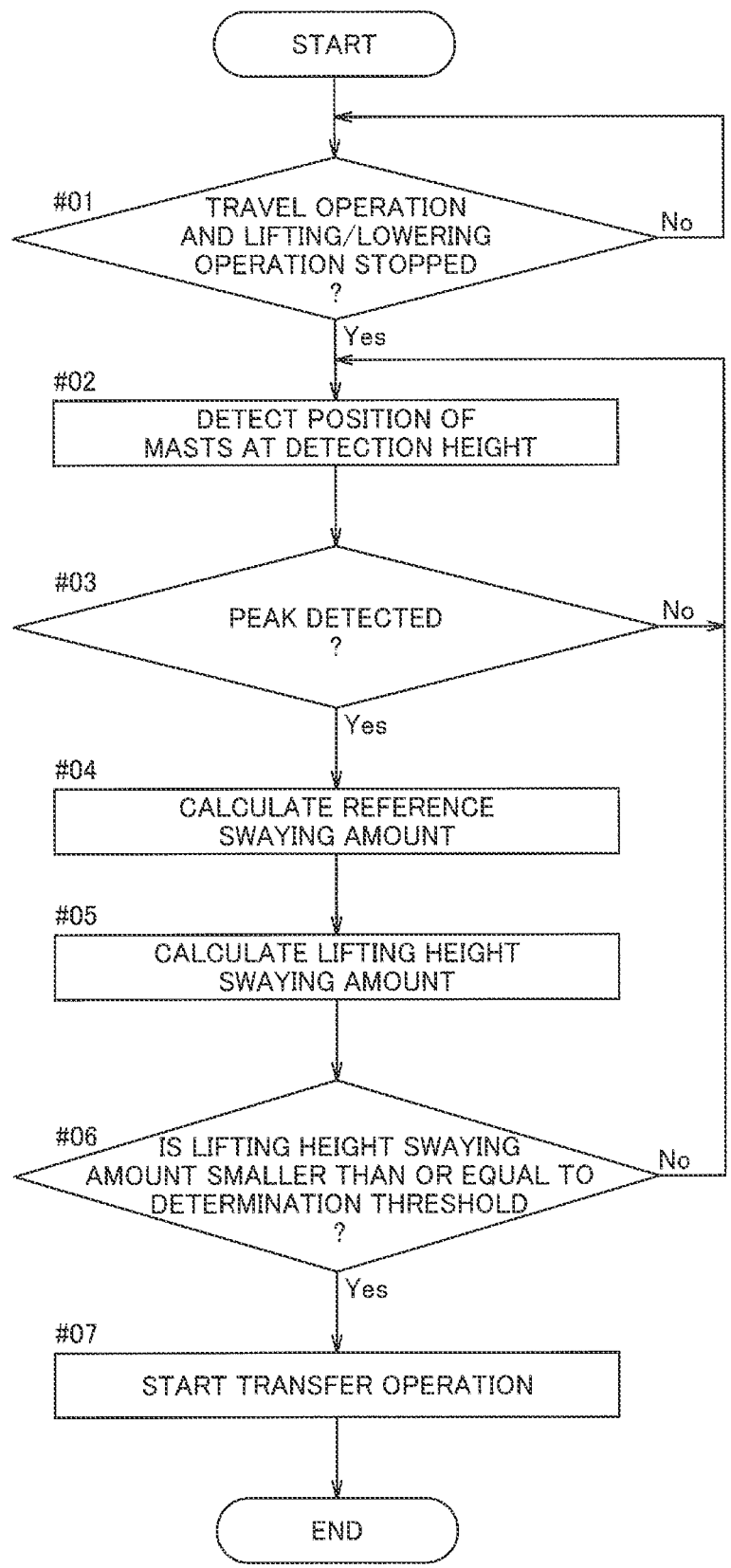
FIG. 8 is a flowchart illustrating processing for determining the start of a transfer operation according to a first embodiment.

The following will describe a procedure of processing for determining the start of the transfer operation of the transfer apparatus 26 that is executed in the control system 1 according to the present embodiment, with reference to FIG. 8. The technical features of the control system 1 disclosed in the present specification are applicable to the method for controlling the stacker crane 20, and the method for controlling the stacker crane 20 is also disclosed in the present specification. The control method includes processing (steps) shown in FIGS. 8 and 9.

As shown in FIG. 8, when, for positioning the transfer apparatus 26 at a position that corresponds to the transfer destination 3, the travel operation of the travel carriage 21 and the operation performed by the lifting apparatus 25 to raise and lower the lift 24 are complete, and these operations are stopped (Yes in step #01), the sway detection unit 10 (specifically, the position detection sensor 11) detects the positions of the masts 22 at the detection height H1 in the route longitudinal direction L (step #02). The detection of the positions of the masts 22 in step #02 is repeated until a peak of swaying of the masts 22 is detected (No in step #03). When a peak of the swaying of the masts 22 is detected (Yes in step #03), the sway detection unit 10 calculates the reference swaying amount X1 (specifically, the amplitude of the swaying of the masts 22 at the detection height H1) (step #04). In the present embodiment, the sway detection unit 10 derives a difference between the reference position A (mast reference position A0 or corrected mast reference position A1) and a detection result of the position detection sensor 11, as the reference swaying amount X1.

Then, the transfer control unit 18 calculates the lifting height swaying amount X2 (the amplitude of swaying of the masts 22 at the lifting height H2) (step #05). The transfer control unit 18 converts the reference swaying amount X1 calculated in step #04 into the lifting height swaying amount X2, thereby deriving the lifting height swaying amount X2. The processing from steps #02 to #05 is repeatedly executed until the lifting height swaying amount X2 calculated in step #05 is smaller than or equal to the determination threshold ΔX (No in step #06). When the lifting height swaying amount X2 calculated in step #05 is smaller than or equal to the determination threshold ΔX (Yes in step #06), the transfer control unit 18 starts the transfer operation of the transfer apparatus 26 (step #07).

Second Embodiment

The following will describe a second embodiment of the stacker crane control system with reference to a drawing (FIG. 9). The present embodiment differs from the first embodiment in the method for detecting the reference swaying amount X1 that is executed by the sway detection unit 10. The following description is given focusing on the difference from the first embodiment. Features that are not stated clearly are the same as those of the first embodiment, and the same reference numerals are given thereto and detailed descriptions thereof are omitted.

In the first embodiment, the sway detection unit 10 detects a difference between the reference position A and a detection result of the position detection sensor 11, as the reference swaying amount X1. In contrast, in the present embodiment, the sway detection unit 10 detects a detection result of the position detection sensor 11 as a reference swaying amount X1, and detects the amplitude of swaying of the masts 22 at the detection height H1 without using the reference position A. Therefore, in the present embodiment, there is no need for the sway detection unit 10 to include the stop position acquiring unit 12 nor store information regarding the mast reference position A0 in the storage unit 19.

In the present embodiment, the sway detection unit 10 acquires the amplitude of a dynamic change in the positions of the masts 22 (i.e., the amplitude of swaying of the masts 22) at the detection height H1 indicated by the detection result of the position detection sensor 11, and detects the amplitude as the reference swaying amount X1. Specifically, the sway detection unit 10 repeatedly acquires a detection result of the position detection sensor 11. The sway detection unit 10 subjects time-series data of the detection results of the position detection sensor 11 to differential processing or the like to detect a peak of the swaying of the masts 22, and acquires the detection result of the position detection sensor 11 at this peak, as a crest value. Also, after having detected the peak of the swaying of the masts 22, the sway detection unit 10 detects the value of half of a difference (i.e., peak-to-peak value) between the currently acquired crest value and the previously acquired crest value, as the amplitude of the dynamic change in the positions of the masts 22 at the detection height H1 (i.e., as the reference swaying amount X1). In the example shown in FIG. 5, at the time T2 for example, the value of half of a difference between the detection result of the position detection sensor 11 at the time T2 and the detection result of the position detection sensor 11 at the time T1 is detected as the reference swaying amount X1.

The following will describe a procedure of processing for determining the start of the transfer operation of the transfer apparatus 26 that is executed in the control system 1 according to the present embodiment, with reference to FIG. 9.

As shown in FIG. 9, when, for positioning the transfer apparatus 26 at a position that corresponds to the transfer destination 3, the travel operation of the travel carriage 21 and the operation performed by the lifting apparatus 25 to raise and lower the lift 24 are complete, and these operations are stopped (Yes in step #10), the sway detection unit 10 (specifically, the position detection sensor 11) detects the positions of the masts 22 at the detection height H1 in the route longitudinal direction L (step #11). The detection of the positions of the masts 22 in step #11 is repeated until a peak of swaying of the masts 22 is detected (No in step #12). When a peak of the swaying of the masts 22 is detected (Yes in step #12), the sway detection unit 10 acquires the detection result of the position detection sensor 11 at this peak as a crest value, and stores this crest value as the previous value (step #13).

Then, the sway detection unit 10 (specifically, the position detection sensor 11) detects the positions of the masts 22 at the detection height H1 in the route longitudinal direction L (step #14). The detection of the positions of the masts 22 in step #14 is repeated until a peak of the swaying of the masts 22 is detected (No in step #15). When a peak of the swaying of the masts 22 is detected (Yes in step #15), the sway detection unit 10 calculates the reference swaying amount X1 (specifically, the amplitude of the dynamic change in the positions of the masts 22 at the detection height H1) (step #16). In the present embodiment, the sway detection unit 10 acquires a detection result of the position detection sensor 11 at the currently detected peak as a crest value, and derives the value of half of a difference between the currently acquired crest value and the previously acquired crest value (crest value stored as the previous value), as the reference swaying amount X1.

Then, the transfer control unit 18 calculates the lifting height swaying amount X2 (the amplitude of swaying of the masts 22 at the lifting height H2) (step #17). The transfer control unit 18 converts the reference swaying amount X1 calculated in step #16 into the lifting height swaying amount X2, thereby deriving the lifting height swaying amount X2. If the lifting height swaying amount X2 calculated in step #17 is not smaller than or equal to the determination threshold ΔX (No in step #18), the previous value is updated to the crest value currently acquired by the sway detection unit 10 (step #19), and the procedure returns to step #14. The processing from steps #14 to #17, and #19 is repeatedly executed until the lifting height swaying amount X2 calculated in step #17 is smaller than or equal to the determination threshold ΔX (No in step #18). When the lifting height swaying amount X2 calculated in step #17 is smaller than or equal to the determination threshold ΔX (Yes in step #18), the transfer control unit 18 starts the transfer operation of the transfer apparatus 26 (step #20).

Other Embodiments

The following will describe other embodiments of the stacker crane control system.

(1) The first embodiment has described a configuration in which information regarding the mast reference position A0 measured when the travel carriage 21 is stopped at each of the plurality of reference stop positions S is stored in the storage unit 19, as an example. However, the present disclosure is not limited to such a configuration. Based on the information regarding the mast reference position A0 measured when the travel carriage 21 is stopped at one reference stop position S, the mast reference position A0 may be set for a plurality of reference stop positions S, as long as no failure will occur in the transfer operation of the transfer apparatus 26 even if the positional relationship between the reference stop position S and the mast reference position A0 in the route longitudinal direction L is regarded as constant.

(2) The first embodiment has described a configuration in which, assuming that the mast reference position A0 or the corrected mast reference position A1 is the reference position A (position of the mast 22 in the static state), the sway detection unit 10 detects a difference between the reference position A and a detection result of the position detection sensor 11, as the reference swaying amount X1, as an example. However, the present disclosure is not limited to such a configuration. A configuration is also possible in which the sway detection unit 10 detects a difference between the reference position A set according to the actual stop position R and a detection result of the position detection sensor 11, as the reference swaying amount X1, as long as no failure will occur in the transfer operation of the transfer apparatus 26 even if the positional relationship between the actual stop position R and the reference position A is regarded as constant.

(3) The above-described embodiments have described a configuration in which the transfer apparatus 26 is configured to advance and retract the holding unit 27 in the route width direction W, and as a result of the advancement and retraction of the holding unit 27 (specifically, as well as raising and lowering of the lift 24), the article 2 is transferred between the holding unit 27 and the transfer destination 3, as an example. However, the present disclosure is not limited to such a configuration. A configuration is also possible in which, for example, the transfer apparatus 26 advances and retracts a pair of forward/rearward moving members (for example, a pair of clamp units, or a pair of arms equipped with a hook) in the route width direction W, the pairs of forward/rearward moving members being arranged on both sides of the article 2 in the route longitudinal direction L, and as a result of the transfer operation of the transfer apparatus 26 (specifically, operation of advancing and retracting the pair of forward/rearward moving members), the article 2 is transferred between the holding unit 27 and the transfer destination 3. In this case, a configuration is also possible in which a conveyor (such as a belt conveyor) for conveying the article 2 in the route width direction W is provided on the holding unit 27 or the above-described forward/rearward moving members, and as a result of the conveying operation of the conveyor as well as the operation of advancing and retracting the pair of forward/rearward moving members, the article 2 is transferred between the holding unit 27 and the transfer destination 3.

(4) The above-described embodiments have described a configuration in which two masts 22 are supported on the travel carriage 21 while being lined up in the route longitudinal direction L, as an example. However, the present disclosure is not limited to such a configuration. A configuration is also possible in which, for example, only one mast 22 is supported on the travel carriage 21, and the lift 24 and the one mast 22 are lined up in the route longitudinal direction L.

(5) Note that the configurations disclosed in the above-described embodiments may be applied while being combined with configurations disclosed in other embodiments (including a combination of embodiments described as other embodiments), provided there is no inconsistency. With respect to other configurations, the embodiments disclosed in this specification are merely examples in all aspects. Accordingly, those skilled in the art may make various changes as appropriate, without departing from the spirit of this disclosure.

Overview of the Embodiments

The following will describe an overview of the stacker crane control system explained above.

A stacker crane control system for controlling a stacker crane including: a travel carriage that travels along a travel route; a mast supported on the travel carriage in an orientation along a vertical direction; a lift that moves up and down within a predetermined lifting range along the mast; a lifting apparatus that raises and lowers the lift; and a transfer apparatus supported by the lift and including a holding unit for holding an article, the stacker crane being configured to perform a transfer operation of transferring the article between the holding unit and a transfer destination, the stacker crane control system including: a sway detection unit configured to detect a reference swaying amount that is a swaying amount of the mast at a detection height, the detection height being set greater than or equal to the height of a lowermost part of the transfer apparatus when the lift is located at an upper limit of the lifting range; a lifting height acquiring unit configured to acquire lifting height information that indicates a lifting height, which is the height of the lift, at a plurality of points in time; and a transfer control unit configured to control the transfer apparatus, wherein the transfer control unit converts the reference swaying amount detected by the sway detection unit into a lifting height swaying amount that is a swaying amount of the mast at the lifting height indicated by the lifting height information, and starts the transfer operation of the transfer apparatus if the lifting height swaying amount is stably smaller than or equal to a predetermined determination threshold.

According to the present configuration, it is possible to obtain a lifting height swaying amount that is a swaying amount of the mast at the actual lifting height, based on an actual swaying amount of the mast that is detected by the sway detection unit, and an actual lifting height of the lift at each point in time that is acquired by the lifting height acquiring unit. Then, if the lifting height swaying amount is stably smaller than or equal to a predetermined determination threshold, the transfer operation of the transfer apparatus is started. Since the transfer operation is started in this way based on a detection result of the actual swaying amount of the mast, the transfer operation of the transfer apparatus can be started at an appropriate time according to the actual swaying amount of the mast that varies depending on various operation conditions.

Here, preferably, the reference swaying amount is an amplitude of swaying of the mast at the detection height, and the lifting height swaying amount is an amplitude of swaying of the mast at the lifting height, and the transfer control unit calculates, as the lifting height swaying amount, X2 defined by the following expression (1)

$$X2 = X1(H2/H1)^3 \quad (1)$$

where H1 is the detection height, H2 is the height of the lift, and X1 is the reference swaying amount.

According to the present configuration, taking into consideration actual deformation due to swaying of the mast supported on the travel carriage, it is possible to convert an actual swaying amount of the mast detected by the sway detection unit into the actual lifting height swaying amount, which is a swaying amount of the mast at a lifting height. Therefore, it is possible to accurately obtain the lifting height swaying amount.

Also, preferably, the travel carriage is controlled so as to be stopped at reference stop positions that are preset at a plurality of locations along the travel route, the stacker crane control system further includes a storage unit in which information regarding a mast reference position measured when the travel carriage is stopped at each of the plurality of reference stop positions is stored, the mast reference position being a position of the mast at the detection height when the travel carriage is stopped at the reference stop position and the mast is standing still, and the sway detection unit includes a position detection sensor configured to dynamically detect the position of the mast at the detection height in a direction along the travel route, and a stop position acquiring unit configured to acquire stop position information that indicates at which of the plurality of reference stop positions the travel carriage is stopped, and the sway detection unit acquires from the storage unit the mast reference position associated with the reference stop position indicated by the stop position information, and detects, as the reference swaying amount, a difference between the mast reference position and a result of the detection by the position detection sensor, as the reference swaying amount.

According to the present configuration, since the travel carriage is controlled so as to stop at reference stop positions preset at a plurality of locations in a direction along the travel route, it is possible to appropriately detect the reference swaying amount, which is an actual swaying amount of the mast at the detection height, based on the mast reference position information measured in advance and stored in the storage unit, and a detection result of the position detection sensor.

In the above-described configuration in which the sway detection unit detects a difference between the mast reference position and a detection result of the position detection sensor, as the reference swaying amount, preferably, the stop position acquiring unit includes a stop-position detection sensor configured to detect an actual stop position, which is a position at which the travel carriage is actually stopped, and the sway detection unit determines a corrected mast reference position by correcting the mast reference position based on a difference between the actual stop position and the reference stop position that corresponds to the actual stop position, and detects, as the reference swaying amount, a difference between the corrected mast reference position and the detection result of the detection by the position detection sensor.

According to the present configuration, taking into consideration an error between the actual stop position, which is a position at which the travel carriage is actually stopped, and the reference stop position, it is possible to correct the reference stop position, which serves as a reference for use in detecting the reference swaying amount. Therefore, according to the present configuration, it is possible to improve the accuracy in detecting the reference swaying amount.

In the stacker crane control system according to the above-described configurations, preferably, the sway detection unit includes a position detection sensor configured to dynamically detect the position of the mast at the detection height in a direction along the travel route, and the sway detection unit detects, as the reference swaying amount an amplitude of a dynamic change in the position of the mast at the detection height which dynamic change is indicated by a result of the detection by the position detection sensor.

According to the present configuration, it is possible to appropriately detect the reference swaying amount, which is an actual swaying amount of the mast at the detection height, based on an amplitude of a dynamic change in the position of the mast at the detection height indicated by the detection result of the position detection sensor. Therefore, according to the present configuration, there is no need to store information regarding the mast reference position in the storage unit, for example, and it is possible to appropriately detect the reference swaying amount with a relatively simple configuration. Also, according to the present configuration, even if the stop position of the travel carriage is not limited to a preset position, it is possible to appropriately detect the reference swaying amount.

It is sufficient for the stacker crane control system according to the present disclosure to be able to realize at least one of the above-described effects.

What is claimed is:

1. A stacker crane control system for controlling a stacker crane, the stacker crane comprising:
a travel carriage configured to travel along a travel route;
a mast supported on the travel carriage in an orientation along a vertical direction;
a lift configured to move up and down within a predetermined lifting range along the mast;
a lifting apparatus configured to raise and lower the lift; and
a transfer apparatus supported by the lift and comprising a holding unit configured to hold an article,
wherein the stacker crane is configured to perform a transfer operation of transferring the article between the holding unit and a transfer destination, and
wherein the travel carriage is controlled so as to be stopped at reference stop positions that are preset at a plurality of locations along the travel route; and the stacker crane control system comprising:
a sway detection unit configured to detect a reference swaying amount that is a swaying amount of the mast at a detection height, with the detection height set greater than or equal to the height of a lowermost part of the transfer apparatus when the lift is located at an upper limit of the lifting range;
a lifting height acquiring unit configured to acquire lifting height information that indicates a lifting height, which is the height of the lift, at a plurality of points in time;
a transfer control unit configured to control the transfer apparatus; and
a storage unit in which information regarding a mast reference position measured when the travel carriage is stopped at each of the plurality of reference stop positions is stored, and the mast reference position is a position of the mast at the detection height when the travel carriage is stopped at the reference stop position and the mast is standing still,
wherein the transfer control unit converts the reference swaying amount detected by the sway detection unit into a lifting height swaying amount that is a swaying amount of the mast at the lifting height indicated by the lifting height information, and starts the transfer operation of the transfer apparatus if the lifting height swaying amount is stably smaller than or equal to a predetermined determination threshold,
wherein the sway detection unit comprises:
a position detection sensor configured to dynamically detect the position of the mast at the detection height in a direction along the travel route; and
a stop position acquiring unit configured to acquire stop position information that indicates at which of the plurality of reference stop positions the travel carriage is stopped, and
wherein the sway detection unit acquires from the storage unit the mast reference position associated with the reference stop position indicated by the stop position information, and detects, as the reference swaying amount, a difference between the mast reference position and a result of the detection by the position detection sensor.

2. The stacker crane control system according to claim 1, wherein:
the reference swaying amount is an amplitude of swaying of the mast at the detection height,
the lifting height swaying amount is an amplitude of swaying of the mast at the lifting height, and
the transfer control unit calculates, as the lifting height swaying amount, X2 defined by the following expression (1)

$$X2 = X1(H2/H1)^3 \qquad (1)$$

where H1 is the detection height, H2 is the height of the lift, and X1 is the reference swaying amount.

3. The stacker crane control system according to claim 1, wherein:
the stop position acquiring unit comprises a stop-position detection sensor configured to detect an actual stop position, which is a position at which the travel carriage is actually stopped, and
the sway detection unit determines a corrected mast reference position by correcting the mast reference position based on a difference between the actual stop position and the reference stop position that corresponds to the actual stop position, and detects, as the reference swaying amount, a difference between the corrected mast reference position and the detection result of the detection by the position detection sensor.

* * * * *